United States Patent
Blake et al.

(10) Patent No.: US 7,943,270 B2
(45) Date of Patent: May 17, 2011

(54) ELECTROCHEMICAL DEVICE CONFIGURATIONS

(75) Inventors: Adam P. Blake, Newton, MA (US); Tao T. Tao, Hopkinton, MA (US)

(73) Assignee: CellTech Power LLC, Westborough, MA (US)

( * ) Notice: Subject to any disclaimer, the term of this patent is extended or adjusted under 35 U.S.C. 154(b) by 1035 days.

(21) Appl. No.: 11/800,050

(22) Filed: May 2, 2007

(65) Prior Publication Data
US 2008/0182147 A1    Jul. 31, 2008

Related U.S. Application Data

(63) Continuation-in-part of application No. 11/167,079, filed on Jun. 24, 2005, now abandoned, which is a continuation of application No. 10/966,455, filed on Oct. 15, 2004, now abandoned, application No. 11/800,050, which is a continuation-in-part of application No. 11/294,676, filed on Dec. 5, 2005, now Pat. No. 7,745,064, which is a continuation of application No. PCT/US2004/018733, filed on Jun. 10, 2004.

(60) Provisional application No. 60/511,729, filed on Oct. 16, 2003, provisional application No. 60/477,281, filed on Jun. 10, 2003.

(51) Int. Cl.
*H01M 8/04* (2006.01)
*H01M 8/24* (2006.01)
*H01M 4/02* (2006.01)
*H01M 4/36* (2006.01)

(52) U.S. Cl. ......... 429/513; 429/452; 429/523; 429/512

(58) Field of Classification Search .................. 429/452, 429/545, 456, 459, 462, 464, 466, 472, 478, 429/498, 507–508, 512–513, 515–516, 523, 429/529, 535; 252/182.1; 137/260
See application file for complete search history.

(56) References Cited

U.S. PATENT DOCUMENTS 460,122 A    9/1891 Edison
(Continued)

FOREIGN PATENT DOCUMENTS

DE    367151    1/1923
(Continued)

OTHER PUBLICATIONS

Alberty, R.A., "Electrochemical Cells Fuel Cells," *Physical Chemistry* (6th Ed.), pp. 228-229 (1983).
(Continued)

*Primary Examiner* — Barbara L Gilliam
*Assistant Examiner* — Claire L Roe
(74) *Attorney, Agent, or Firm* — Wolf, Greenfield & Sacks, P.C.

(57) ABSTRACT

The present invention generally relates to electrochemical devices such as fuel cells and, in particular, to various component configurations including configurations for converting common fuels directly into electricity without additional fuel reforming or processing. Certain aspects of the invention are generally directed to configurations in which an anode of the device surrounds the electrolyte and/or the cathode of the device. In some embodiments, all single cells in a fuel cell stack share a common anode fuel chamber. The anode, in some cases, may be exposed to a fuel. In one set of embodiments, the anode of the device may be fluid during operation of the fuel cell, and in some cases, a porous container may be used to contain the anode during operation of the fuel cell. Other aspects of the invention relate to methods of making such devices, methods of promoting the making or use of such devices, and the like.

46 Claims, 5 Drawing Sheets

U.S. PATENT DOCUMENTS

| | | | |
|---|---|---|---|
| 3,138,490 A | | 6/1964 | Tragert et al. |
| 3,245,836 A | * | 4/1966 | Agruss ............... 429/419 |
| 3,432,352 A | | 3/1969 | White et al. |
| 3,499,798 A | * | 3/1970 | Mehra et al. ........... 429/442 |
| 3,741,809 A | | 6/1973 | Anbar |
| 3,953,227 A | | 4/1976 | Jones et al. |
| 3,970,474 A | | 7/1976 | Anbar et al. |
| 3,982,957 A | | 9/1976 | Jones et al. |
| 4,042,755 A | | 8/1977 | Anbar |
| 4,170,534 A | | 10/1979 | Fitterer |
| 4,551,400 A | | 11/1985 | Sapru et al. |
| 4,670,702 A | | 6/1987 | Yamada et al. |
| 4,702,971 A | | 10/1987 | Isenberg |
| 4,824,739 A | | 4/1989 | Breault et al. |
| 4,826,740 A | | 5/1989 | Costa |
| 4,853,094 A | | 8/1989 | Honders et al. |
| 4,883,724 A | | 11/1989 | Yamamoto |
| 4,894,297 A | | 1/1990 | Singh et al. |
| 4,973,531 A | | 11/1990 | Zaima et al. |
| 5,035,962 A | | 7/1991 | Jensen |
| 5,045,170 A | | 9/1991 | Bullock et al. |
| 5,139,895 A | | 8/1992 | Roy et al. |
| 5,209,989 A | | 5/1993 | Ishihara et al. |
| 5,290,323 A | | 3/1994 | Okuyama |
| 5,298,340 A | | 3/1994 | Cocks et al. |
| 5,312,699 A | | 5/1994 | Yanagi et al. |
| 5,316,870 A | | 5/1994 | Ohga |
| 5,348,812 A | | 9/1994 | Cocks et al. |
| 5,350,641 A | | 9/1994 | Mogensen et al. |
| 5,376,469 A | | 12/1994 | Gur et al. |
| 5,455,127 A | | 10/1995 | Olson et al. |
| 5,523,177 A | | 6/1996 | Kosek et al. |
| 5,532,078 A | | 7/1996 | Redey et al. |
| 5,558,947 A | | 9/1996 | Robison |
| 5,567,540 A | | 10/1996 | Stone et al. |
| 5,589,287 A | | 12/1996 | Hatoh et al. |
| 5,589,289 A | | 12/1996 | Zhang et al. |
| 5,591,537 A | | 1/1997 | Bagger et al. |
| 5,595,832 A | | 1/1997 | Tomimatsu et al. |
| 5,595,833 A | | 1/1997 | Gardner et al. |
| 5,601,945 A | | 2/1997 | Clough |
| 5,604,048 A | | 2/1997 | Nishihara et al. |
| 5,637,414 A | | 6/1997 | Inoue et al. |
| 5,747,185 A | | 5/1998 | Hsu |
| 5,750,278 A | | 5/1998 | Gillett et al. |
| 5,766,786 A | | 6/1998 | Fleck et al. |
| 5,866,090 A | | 2/1999 | Nakagawa et al. |
| 5,942,349 A | | 8/1999 | Badwal et al. |
| 5,985,474 A | | 11/1999 | Chen et al. |
| 6,096,449 A | | 8/2000 | Fuglevand et al. |
| 6,120,926 A | | 9/2000 | Szydlowski et al. |
| 6,120,933 A | | 9/2000 | Phelps |
| 6,127,057 A | | 10/2000 | Gorman |
| 6,162,554 A | | 12/2000 | Nolscher et al. |
| 6,200,697 B1 | | 3/2001 | Pesavento |
| 6,221,522 B1 | | 4/2001 | Zafred et al. |
| 6,242,120 B1 | | 6/2001 | Herron |
| 6,265,093 B1 | | 7/2001 | Surampudi et al. |
| 6,300,011 B1 | | 10/2001 | Lin et al. |
| 6,348,278 B1 | | 2/2002 | LaPierre et al. |
| 6,379,485 B1 | | 4/2002 | Borglum |
| 6,379,844 B1 | | 4/2002 | Redey et al. |
| 6,383,678 B1 | | 5/2002 | Kaneko |
| 6,403,246 B1 | | 6/2002 | Mizuno |
| 6,461,751 B1 | | 10/2002 | Boehm et al. |
| 6,587,766 B2 | | 7/2003 | Bruckner |
| 6,599,662 B1 | | 7/2003 | Chiang et al. |
| 6,641,944 B2 | | 11/2003 | Kawasumi et al. |
| 6,692,861 B2 | | 2/2004 | Tao |
| 6,827,832 B2 | | 12/2004 | Henuset et al. |
| 6,890,672 B2 | | 5/2005 | Dickman et al. |
| 7,678,484 B2 | | 3/2010 | Tao et al. |
| 2002/0015871 A1 | | 2/2002 | Tao |
| 2002/0015877 A1 | | 2/2002 | Tao |
| 2002/0051900 A1 | | 5/2002 | Okamoto et al. |
| 2002/0114990 A1 | | 8/2002 | Fly et al. |
| 2003/0143440 A1 | | 7/2003 | Tao et al. |
| 2004/0058203 A1 | | 3/2004 | Priestnall et al. |
| 2004/0166398 A1 | | 8/2004 | Tao et al. |
| 2004/0202924 A1 | * | 10/2004 | Tao et al. ............ 429/102 |
| 2004/0251241 A1 | | 12/2004 | Blutke et al. |
| 2005/0089738 A1 | | 4/2005 | Tao et al. |
| 2006/0040167 A1 | | 2/2006 | Blake et al. |
| 2007/0048555 A1 | | 3/2007 | Blake et al. |

FOREIGN PATENT DOCUMENTS

| | | |
|---|---|---|
| DE | 2650960 A1 | 5/1977 |
| DE | 4004220 C1 | 4/1991 |
| DE | 19946695 A1 | 4/2000 |
| DE | 19961496 A1 | 7/2000 |
| EP | 0001351 A1 | 4/1979 |
| EP | 0333261 A2 | 9/1989 |
| EP | 0817297 A2 | 1/1998 |
| EP | 1132986 A2 | 9/2001 |
| EP | 1148566 A2 | 10/2001 |
| FR | 2020742 | 7/1970 |
| FR | 2207365 | 6/1974 |
| GB | 126766 | 5/1919 |
| GB | 940900 | 11/1963 |
| GB | 1276260 | 6/1972 |
| GB | 2278010 A | 11/1994 |
| JP | 08-96826 | 2/1985 |
| JP | 60-32254 | 4/1996 |
| WO | WO 90/02425 A1 | 3/1990 |
| WO | WO 95/09450 A1 | 4/1995 |
| WO | WO 00/77872 A1 | 12/2000 |
| WO | WO 01/28019 A2 | 4/2001 |
| WO | WO 01/80335 A2 | 10/2001 |
| WO | WO 01/97314 A1 | 12/2001 |
| WO | WO 03/001617 A2 | 1/2003 |
| WO | WO 03/044887 A2 | 5/2003 |
| WO | WO 03/067683 A2 | 8/2003 |
| WO | WO 2004/112175 A2 | 12/2004 |

OTHER PUBLICATIONS

Grant Abstract, "Novel Carbon Ion Fuel Cells," P/METC-DE-FG22-93PC93219, Duke Univ.

Grant Abstract, "Novel Carbon Ion Fuel Cells," P/PETC-FG22-93PC93219, Duke Univ.

Gur et al., "Direct Electrochemical Conversion of Carbon to Electrical Energy in a High Temperature Fuel Cell," *J. Electrochem.*, vol. 139, No. 10 pp. L95-L97 (1992).

Lu et al., "Development of solid oxide fuel cells for the direct oxidation of hydrocarbon fuels," *Solid State Ionics*, vol. 152, pp. 383-397 (2002).

Weaver et al., "Direct use of coal in a fuel cell: feasibility investigation," *Chemical Abstracts*, 180031, vol. 85, No. 24, p. 146.

Yentekakis et al., "A Novel Fused Metal Anode Solid Electrolyte Fuel Cell for Direct Coal Gasification: A Steady-State Model," *Ind. Eng. Chem. Res.*, vol. 28, pp. 1414-1424 (1989).

* cited by examiner

ELECTROCHEMICAL DEVICE CONFIGURATIONS

RELATED APPLICATIONS

This application claims priority to all of the following according to the following recitation of priority relationships. This application is a continuation-in-part of U.S. patent application Ser. No. 11/294,676, filed Dec. 5, 2005, entitled "Oxidation Facilitator," by A. Blake, et al., which application is a continuation of International Patent Application No. PCT/US2004/018733, filed Jun. 10, 2004, entitled "Oxidation Facilitator," by A. Blake, et al., published as WO 2004/112175 on Dec. 23, 2004, which application claims the benefit of U.S. Provisional Patent Application Ser. No. 60/477,281, filed Jun. 10, 2003, entitled "Oxidation Facilitator," by A. Blake, et al. This application is also a continuation-in-part of U.S. patent application Ser. No. 11/167,079, filed Jun. 24, 2005, entitled "Components for Electrochemical Devices Including Multi-Unit Device Arrangements," by A. Blake, et al., published as U.S. Patent Application Publication No. 2006/0040167 on Feb. 23, 2006, which is a continuation of U.S. patent application Ser. No. 10/966,455, filed Oct. 15, 2004, entitled "Components for Electrochemical Devices Including Multi-Unit Device Arrangements," by A. Blake, et al., which claims the benefit of U.S. Provisional Patent Application Ser. No. 60/511,729, filed Oct. 16, 2003, entitled "Components for Electrochemical Devices Including Multi-Unit Device Arrangements," by A. Blake, et al. Each of these applications is incorporated herein by reference.

GOVERNMENT FUNDING

Research leading to various aspects of the present invention were sponsored, at least in part, by the Defense Advanced Research Projects Agency, Grant No. W911QY-04-2-0003. The U.S. Government has certain rights in the invention.

FIELD OF INVENTION

The present invention generally relates to electrochemical devices such as fuel cells and, in particular, to various component configurations.

BACKGROUND

The conversion of fuel to energy defines technology at the center of one of the most important industries in existence. Most energy conversion in this arena involves the combustion of fuel to produce mechanical, thermal, and/or electrical energy. Coal, oil, and gasoline are common fuels typically used in conventional combustion technology. The combustion of these common fuels (burning) involves applying enough heat to the fuel, in the presence of an oxidant such as the oxygen in air, for the fuel to undergo a relatively spontaneous and ill-defined combustive, often explosive, reaction in which chemical bonds in the fuel break and reactions with oxygen occur to produce new compounds that are released into the environment (exhaust). In the process, energy is released in the form of heat and an expansive force, which can be used to drive a piston, turbine, or other mechanical device. This mechanical energy can be used directly, e.g., to drive an automobile or propel a jet aircraft. It also can be converted into electrical energy by linking the mechanical device to an electrical generator. Or it can simply be used to provide heat, e.g., in a home.

Fuel combustion is, as noted, relatively ill-defined. That is, the precise chemistry occurring during combustion is not well known or easily controlled. What is known is that the resulting exhaust typically includes a wide variety of toxic compounds such sulfur-containing toxins, nitrous compounds, and unburned fuel droplets or particles (soot), some of which can be converted by sunlight into other toxins such as ozone, as well as a significant amount of carbon dioxide which, while not toxic, is an important greenhouse gas that many experts believe is affecting the environment.

Cutting edge research and development in the area of energy conversion is generally aimed at improving efficiency and/or reducing the emission of toxic pollutants and greenhouse gases. Fuel cells represent a significant advance in this area. Fuel cells are generally very clean and efficient, and also are very quiet, unlike most combustion engines and turbines. Fuel cells convert fuel directly into electrical energy via a relatively well-defined, controllable, electrochemical reaction that does not involve explosive combustion. In some systems, the only reaction product exhausted into the environment is water. In electrical production, no intermediate mechanical device, such as a piston engine or turbine, is needed; thus, the process is generally much more efficient, since intermediate mechanical devices cause significant energy loss through friction, etc. The efficiency of conversion of fuel to mechanical energy via combustion in a piston engine is also hampered by the laws of physics; the Carnot Cycle, via which piston engines operate, determine the limit of efficiency in the conversion of heat, from combustion, into mechanical work. Significant loss of energy is unavoidable.

While fuel cell technology has been developed to some extent, it has not assumed a significant role in worldwide energy conversion, partially because hydrogen has to be used as fuel or common fuels have to be reformed into hydrogen rich stream to be used in fuel cells. Reforming common fuel also typically causes substantially increase in system complexity and cost, and also contributes to efficiency loss. Significant improvements are likely needed for greater acceptance in worldwide energy conversion.

SUMMARY OF THE INVENTION

The present invention generally relates to electrochemical devices such as fuel cells and, in particular, to various component configurations, thus making them suitable for converting common fuels directly into electricity without additional fuel reforming. The subject matter of the present invention involves, in some cases, interrelated products, alternative solutions to a particular problem, and/or a plurality of different uses of one or more systems and/or articles.

The present invention is directed towards a fuel cell, in a first aspect of the invention. In one set of embodiments, the fuel cell includes an anode, a substantial portion of which is fluid during operation of the fuel cell, a porous container able to contain the anode during operation of the fuel cell, an electrolyte at least partially contained within the anode, and a cathode at least partially contained within the electrolyte. According to another set of embodiments, the fuel cell includes a tin anode, a ceramic porous container containing the tin anode, a ceramic electrolyte at least partially contained within the anode, and a cathode at least partially contained within the electrolyte. In some cases, the tin is liquid during operation of the fuel cell.

In another aspect, the present invention is an electrochemical device. In one set of embodiments, the electrochemical device comprises a plurality of fuel cells, each fuel cell comprising an anode, a substantial portion of which is fluid during operation of the fuel cell, and a porous container able to contain the anode during operation of the fuel cell, and a housing containing the plurality of fuel cells, the housing connectable to a source of fuel.

In another aspect, the present invention is directed to a method of making one or more of the embodiments described herein. In another aspect, the present invention is directed to a method of using one or more of the embodiments described herein.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
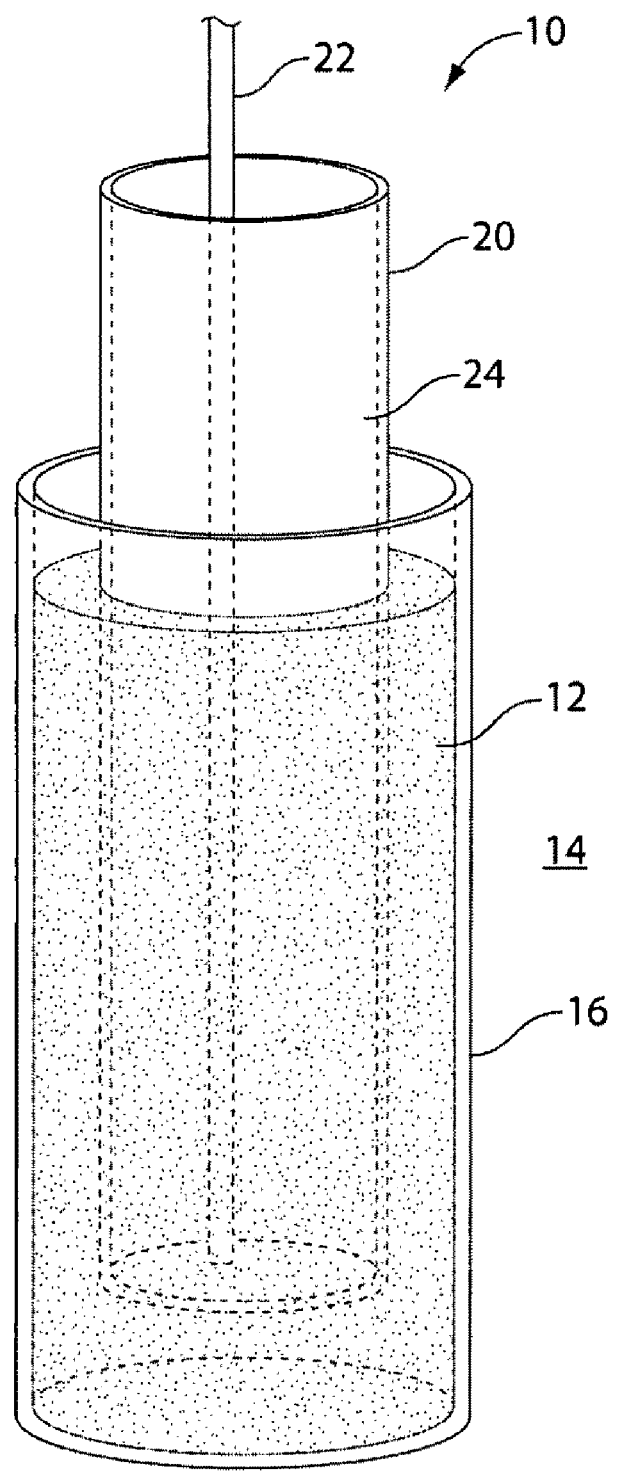
FIG. 1 is an illustration of a general arrangement of a chemical or fuel-rechargeable energy conversion unit which can find use in the present invention.

The present invention generally relates to electrochemical devices such as fuel cells and, in particular, to various component configurations, including configurations for converting common fuels directly into electricity without additional fuel reforming or processing. Certain aspects of the invention are generally directed to configurations in which an anode of the device surrounds the electrolyte and/or the cathode of the device. In some embodiments, all single cells in a fuel cell stack share a common anode fuel chamber. The anode, in some cases, may be exposed to a fuel. In one set of embodiments, the anode of the device may be fluid during operation of the fuel cell, and in some cases, a porous container may be used to contain the anode during operation of the fuel cell. Other aspects of the invention relate to methods of making such devices, methods of promoting the making or use of such devices, and the like.

The following documents are incorporated herein by reference: International Patent Application No. PCT/US01/12616, filed Apr. 18, 2001, entitled "An Electrochemical Device and Methods for Energy Conversion," by T. Tao, et al., published as WO 01/80335 on Oct. 25, 2001; U.S. patent application Ser. No. 09/819,886, filed Mar. 28, 2001, entitled "A Carbon-Oxygen Fuel Cell," by T. Tao, published as U.S. Patent Application Publication No. 2002/0015877 on Feb. 7, 2002, now U.S. Pat. No. 6,692,861, issued Feb. 17, 2004; International Patent Application No. PCT/US02/37290, filed Nov. 20, 2002, entitled "An Electrochemical System and Methods for Control Thereof," by T. Tao, et al., published as WO 03/044887 on May 30, 2003; International Patent Application No. PCT/US03/03642, filed Feb. 6, 2003, entitled "Current Collectors," by T. Tao, et al., published as WO 03/067683 on Aug. 14, 2003; U.S. Provisional Patent Application Ser. No. 60/492,924, filed Aug. 6, 2003, entitled "Electroplating Systems and Methods," by T. Tao, et al.; U.S. patent application Ser. No. 11/294,676, filed Dec. 5, 2005, entitled "Oxidation Facilitator," by A. Blake, et al.; and U.S. patent application Ser. No. 11/167,079, filed Jun. 24, 2005, entitled "Components for Electrochemical Devices Including Multi-Unit Device Arrangements," by A. Blake, et al., published as U.S. Patent Application Publication No. 2006/0040167 on Feb. 23, 2006. Also incorporated herein by reference are a U.S. provisional patent application filed on even date herewith, entitled "Porous Ceramic Materials," by T. Tao, et al.; and a U.S. provisional patent application filed on even date herewith, entitled "Electrode Arrangements for Fuel Cells and other Applications," by T. Tao.

A variety of electrochemical devices can benefit from the present invention. Wherever "fuel cell" is used in any of the references incorporated herein, it is to be understood that any electrochemical device, including all disclosed herein, can be substituted.

The present invention provides, generally, structures and arrangements for facilitating an electrochemical reaction at an electrode of an electrochemical device, with particular use in fuel cells and other fuel-to-energy conversion devices, typically in the absence of additional fuel reforming or processing. A fuel-to-energy conversion device is a device that converts fuel to electrical energy electrochemically; that is, without combustion of the fuel (although a fuel-to-energy conversion devices could be used in conjunction with a device deriving energy from combustion of the same fuel; most fuel cells do not). A typical, conventional fuel cell includes two electrodes, an anode and a cathode, an electrolyte in contact with both the anode and cathode, and an electrical circuit connecting the anode and the cathode from which power created by the device is drawn. In typical operation, an oxidant (e.g., oxygen, or simply air) is provided to the cathode where it is chemically reduced, e.g., to oxygen ions, which are delivered to the anode via the electrolyte. Fuel, such as hydrogen, a hydrocarbon, and/or a carbonaceous fuel (or other fuels, e.g., described herein), is supplied to the anode, where it reacts with the oxygen ions to form water and/or carbon dioxide, and the reaction releases electrons as the fuel is oxidized. The electrons are removed from the anode by a current collector, or other component of an electrical circuit. The overall reaction is energetically favorable, i.e., the reaction gives up energy in the form of energetic or power driving electrons from the anode, through electrical circuitry, to the cathode. This energy can be captured for essentially any purpose. However, fuel cells, in general, require hydrogen as fuel. In the case of common fuels, a fuel processing or refueling step, converting common fuels into hydrogen rich stream, is often utilized in the prior art, and such processing or reforming adds to complexity, cost to the system, and may cause a loss in fuel efficiency. In contrast, in one embodiment of the present invention, an electrochemical device having one a single fuel cell, or a stack of multiple fuel cells, is provided, which can be used to directly convert common fuels into electricity.

Some embodiments of the present invention also can act as a rechargeable energy conversion unit, using fuel to produce energy which can be immediately discharged for use, can be stored for later discharge, or the like. In an energy conversion storage process, fuel can be supplied to an anode and reacted with oxides as the fuel is oxidized, as described above, with energy being stored in the unit. In one embodiment, energy can be stored in the anode, in this process, as the oxidation of fuel drives a metal/metal oxide species equilibrium within the anode toward the metal (metal oxide is reduced to metal). This stored energy can be discharged by allowing this equilibrium to move toward the metal oxide species (with metal or metal oxide reacting with oxygen ion, described above, to generate metal oxide or a more oxidized metal oxide species, respectively). In some embodiments of the invention, the storage of energy can take other forms; in case of carbon rich fuels, soot deposition in the anode fuel chamber often occurs. Pre-charged carbon in the anode fuel chamber and/or soot formed during operation may react in situ with water or carbon dioxide, which may further release hydrogen and/or carbon monoxide, both being usable as fuel. In this arrangement, fuel-to-energy conversion can result in energy, all of which (with the exception of that lost to thermodynamic inefficiency) can be stored in the device, all of which can be discharged for use simultaneous with conversion, or the device can operate with the level of energy conversion during fuel consumption at a level varying independently with the amount of energy discharged by the device. For example, where more energy can be converted from fuel in the device than is discharged by the device, storage can occur, and where more discharge by the device is required than the amount of energy that can be converted from fuel, the energy mismatch can be made up by drawing upon stored energy within the device. Any or all of these processes can happen simultaneously or independently of each other. In some embodiments, the present invention provides structures and arrangements for linking a plurality of electrochemical devices such that they can operate together, and related methods and techniques.

Individual aspects of the overall electrochemistry and/or chemistry involved in electrochemical devices such as those described herein is generally known, and will not be described in detail herein. The reader can refer to the patent applications and publications incorporated herein by reference for a detailed description of some of the specific electrochemistry involved in various devices that can find use in connection with the present invention.

One aspect of the invention is generally directed to a fuel cell (or other electrochemical device) containing an anode surrounding an electrolyte and/or a cathode. The anode may be fluid during operation, and contained within a separator, which can be exposed to a fuel surrounding the separator. In some cases, as discussed below, the separator may be a refractive ceramic, and in some embodiments, the separator is porous.

Referring now to FIG. 1, a schematic illustration of one general geometric arrangement of an electrochemical device is shown. As used herein, a "chemical or fuel-rechargeable energy conversion unit" is a unit which has the ability to electrochemically convert a fuel (a chemical) to energy, and to store at least a portion of that energy for later discharge, with or without additional fuel processing or reforming in case of common fuels are used. In one embodiment, the unit can convert fuel to energy and store essentially all of that energy (all of the energy not lost to thermodynamic inefficiencies), for later discharge.

In another embodiment, some of the converted energy is discharged (used to provide power to a home, auto, business, etc.) essentially immediately upon conversion, while some is stored for discharge later, e.g. when fuel is not available and/or when power demands exceed the ability of the device to convert fuel to energy.

In FIG. 1, electrochemical device 10 is arranged in a substantially cylindrical configuration including outer container 16 (which may be, e.g., a porous separator, as discussed below), containing anode 12, a substantial portion of which may become fluid during operation of electrochemical device 10. Within anode 12 is a cylindrical electrolyte 20, immersed within at least a portion of anode 12, and cathode 24, contained within electrolyte 20. Within cathode 24 is conduit 22, positioned to deliver air (or another oxidant) to cathode 24. In some cases, conduit 22 is defined by a current collector and an electrode surrounding the current collector, where the current collector and the electrode define one or more channels, e.g., via one or more projections or ribs such that the cathode and the current collector are not in intimate contact, for instance, as is discussed in a U.S. provisional patent application filed on even date herewith, entitled "Electrode Arrangements for Fuel Cells and other Applications," by T. Tao, incorporated herein by reference. Typically, as discussed below, fuel 14 outside of the electrochemical device 10 may be transported across outer container 16 to reach anode 12. For instance, outer container 16 may be porous, as discussed below.

A variety of modifications can be made to the arrangement of FIG. 1 to increase or decrease thickness of any component and/or change the relative surface area of contact between any two components in comparison to the surface area of contact between any other two components. For example, the "thickness" of anode 12 can be varied simply by varying the external diameter of outer container 16 and/or the internal diameter of electrolyte 20. As an example of relative surface area variation, the surface area of outer container 16 exposable to anode 12 can be decreased, relative to the surface area of electrolyte 20 exposed to anode 12, by decreasing the height of outer container 16 and/or decreasing its radius. The same can be decreased by decreasing the fluid level of anode 12 within outer container 16.

The ability to vary the thickness of the elements of an electrochemical device according to various embodiments of the invention and/or adjust the relative areas of surface contact between components of the device can impact the power output or the efficiency of the device. For example, portions of the system which are of relatively low conductivity, high diffusion resistance (polarization), or are otherwise rate limiting, may be decreased in thickness. Similarly, it is possible to reduce the amount of higher cost materials used. In particular, embodiments of the present invention allow a liquid anode to be contained by a porous separator, in turn allowing the anode to be kept relatively thin (e.g., significantly, proportionately thinner than as illustrated in FIG. 1). Reductions in anode thickness, in some embodiments, can reduce the diffusion (polarization) resistance of the electrochemical device, and reduces the amount of anode material required, improving power output and/or efficiency, and/or reducing cost and weight.

In typical use, an oxidant, such as air, is allowed to contact cathode 24, e.g., via conduit 22. Electrons delivered from an external circuit, described more fully below, may combine with oxygen molecules (or other oxidant) at cathode 24 to form oxygen ions, and deliver the oxygen ions across electrolyte 20 to anode 12. In one embodiment, anode 12 is a liquid anode comprising a metal and various oxidation products of the metal. In such an arrangement, the oxygen ions delivered by the electrolyte can oxidize anode metal atoms to form an oxidation product (which can be one of a variety of oxidation products including metal oxide, in various stoichiometries, optionally with other species) and releases electrons, forming an electric circuit. An oxygen containing species (e.g., dissolved oxygen or oxides) may diffuse within anode 12, reaching inner container 16, while fuel 14 can diffuse across outer container 16 to the inner surface to oxidize the fuel 14. In some cases fuel 14 (e.g., hydrogen) may dissolve slightly in anode 12, and/or partial fuel oxidation may occur within the anode 12. Fuel is delivered from a source that is not shown. In some arrangements, the anode exhaust can simply vent into air, but in many arrangements, the anode exhaust will be collected in an exhaust conduit and can be treated in an environmentally sound manner. The anode exhaust typically will contain water, unspent fuel (which can be re-used), and/or carbon dioxide.

Figure 2:
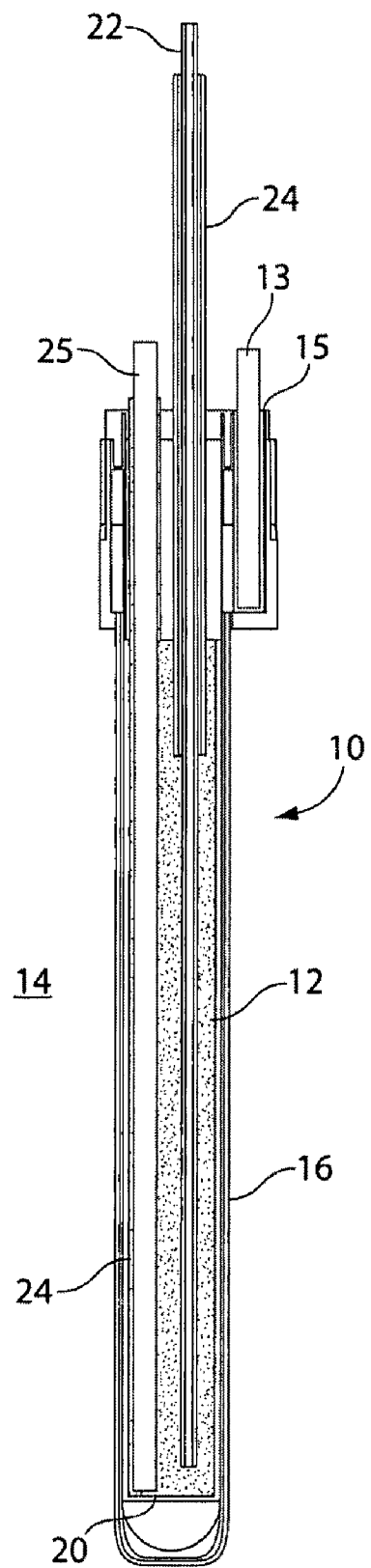
FIG. 2 is an illustration of another embodiment of the invention, showing a chemical or fuel-rechargeable energy conversion unit.

FIG. 2 illustrates another embodiment of the invention. FIG. 2 also shows a substantially cylindrical electrochemical device, device 10, which includes an outer container 16 (which may be a separator, such as a porous refractive ceramic separator), containing anode 12. The upper portion of anode 12 contacts anode current collector 13, which is mounted in place using ceramic jacket 15. During operation, a substantial portion of anode 12 may become fluid. However, container 16 may be constructed and arranged to prevent the liquid anode 12 from exiting the device.

Adjacent to anode 12 is electrolyte 20, and adjacent to electrolyte 20 is cathode 24. Within cathode 24 is a cathode current collector 25. In the embodiment shown in FIG. 2, cathode current collector 25 includes a metal core and a ceramic shell surrounding at least a portion of the metal core. In addition, conduit 22 in device 10 passes air into the device, while conduit 23 removes air from the device. It should be noted that conduits 22 and 23 are contained within cathode 24.

This device may be contacted with a fuel 14 that is external of the device. If container 16 is porous, fuel may be able to pass through container 16 to come into contact with anode 12. However, in some embodiments, container 16 may be chosen to have a porosity (and/or other characteristics) such that fuel is able to be transported across container 16 to reach anode 12, but anode 12, even if substantially liquid, is not able to readily flow across container 16, away from device 10, into fuel 14. During operation, anode current collector 13 and cathode current collector 25 may be connected to an electrochemical device (either singly, or with other devices, such as a plurality of devices having the same configuration) to complete a circuit, e.g., to produce power.

It is to be understood that the specific electrochemical devices described herein are exemplary only, and the components, connections, and techniques of the present invention can be applied to virtually any suitable electrochemical device including those with a variety of solid, liquid, and/or gaseous fuels, and a variety of anodes, cathodes, and electrolytes, all of which can be liquid or solid under operating conditions (where feasible; generally, for adjacent components one will be solid and one will be liquid if any are liquids). It is also to be understood that the chemical or fuel-rechargeable energy conversion unit arrangement of FIGS. 1 and 2 are merely examples of electrochemical devices that can make use of systems and techniques of the present invention as recited herein. Many structural arrangements other than those disclosed herein, which make use of and are enabled by the present invention, will be apparent to those of ordinary skill in the art, and some are disclosed herein.

The invention allows for modification of design that can be used to affect device power, battery storage capacity, and makes them suitable for converting common fuels directly into electricity without additional fuel reforming, in certain embodiments of the invention. For example, by increasing surface area of contact between the container positioned between the fuel and anode, continuous power output is improved. By increasing the amount of anode present, battery storage is increased, in embodiments where a rechargeable anode is used. Each of these can be controlled, independently of each other, e.g. by changing the radius of the container (where cylindrical), or designing the container in other ways to geometrically create more surface area (e.g. with a wavy, jagged, and/or a porous separator), and/or by increasing or decreasing the thickness of the anode. These changes can be useful when designing different fuel-to-energy conversion devices for different uses requiring more or less power and/or more or less battery storage capacity, e.g., for home power use, commercial or industrial use, automobile use, different climates, portable, mobile or stationary applications, etc.

Electrochemical devices of the present invention may take the form of any kind of electrochemical device including fuel cells, batteries, fuel-to-energy conversion devices such as chemical or fuel-rechargeable energy conversion units, dual function devices, electrochemical devices comprising chemically rechargeable anodes, and essentially any similar devices such as those disclosed in International Patent Application No. PCT/US01/12616, filed Apr. 18, 2001, entitled "An Electrochemical Device and Methods for Energy Conversion," by T. Tao, et al., published as WO 01/80335 on Oct. 25, 2001, or U.S. patent application Ser. No. 11/167,079, filed Jun. 24, 2005, entitled "Components for Electrochemical Devices Including Multi-Unit Device Arrangements," by A. Blake, et al., published as U.S. Patent Application Publication No. 2006/0040167 on Feb. 23, 2006, each incorporated herein by reference. As described above, electrochemical devices according to the present invention may also have a wide variety of geometries including cylindrical, planar, and other configurations.

An electrochemical device according to the present invention may be combined with additional electrochemical devices to form a larger device or system. In some embodiments this may take the form of a stack of units or devices, such as fuel cells. Where more than one electrochemical device is combined, the devices may all be devices according to the present invention, or one or more devices according to the present invention may be combined with other electrochemical devices, such as conventional solid oxide fuel cells. Fuel-to-energy conversion devices are provided as one non-limiting example of electrochemical devices which can be linked in accordance with the invention. It is to be understood that where this terminology is used, any suitable electrochemical device, which those of ordinary skill in the art would recognize could function in accordance with the systems and techniques of the present invention, can be substituted. For example, in one embodiment of the invention, a plurality of devices similar to that shown in FIG. 1 or 2 are positioned in a container such that a common fuel is able to interact with all of the devices. Fuel may be brought to the container through a common inlet.

Various components of the invention, such as the anode, cathode, current collectors, electrolyte, separator, container, circuitry, etc. can be fabricated by those of ordinary skill in the art from any of a variety of components, as well as those described in any of those patent applications described herein. Components of the invention can be molded, machined, extruded, pressed, isopressed, infiltrated, coated, in green or fired states, or formed by any other suitable technique. Those of ordinary skill in the art are readily aware of techniques for forming components of devices herein. Specific examples of various components follow, but the invention is not to be considered limited to these.

The anode can be formed from any suitable material. As an example, the anode can be a rechargeable anode, such as is taught in International Patent Application No. PCT/US01/12616, filed Apr. 18, 2001, entitled "An Electrochemical Device and Methods for Energy Conversion," by T. Tao, et al., published as WO 01/80335 on Oct. 25, 2001, incorporated herein by reference, and can be selected from among metal or metal alloy anodes that are capable of existing in more than two oxidation states or in non-integral oxidation states. Certain metals can be oxidized to one or more oxidation states, any one of these states being of a sufficient electrochemical potential to oxidize the fuel. Conversely, if that metal is oxidized to its highest oxidation state, it may be reduced to more than one lower oxidation state (i.e., at least one having a higher oxidation state than neutral) where the anode is capable of functioning in any of these states. Alternatively, a metal oxide or mixed metal oxide may collectively oxidize fuel where metal ions are reduced by formal non-integer values.

Where a metal anode is used, the anode can be a mixture or an alloy of different metals in some cases (e.g., if the different metals are in the solid state). In such an arrangement, metal atoms in the anode can cycle between two or more oxidation states including metal and various species of metal oxide. The overall reaction described is energetically favorable, thus power can be drawn from an electrical circuit connecting the anode with the cathode.

Examples of anodic material that can be used to form the anode, or compounded with other materials to define an anode, include fluid anodes such as liquid anodes (that is, a material that is a liquid at operating temperatures of the device). In one embodiment, the device is operable, with the anode in a liquid state, at a temperature of less than about 1500° C., less than about 1300° C., less than about 1200° C., less than about 1000° C., or less than about 800° C. By "operable," it is meant that the device is able to generate electricity, either as an electrochemical device such as a fuel-to-energy conversion device, a fuel cell, or as a rechargeable device such as a battery and/or a chemical or fuel-rechargeable energy conversion unit with the anode in a liquid state, and the anode may not necessarily be a liquid at room temperature. It is understood by those of ordinary skill in the art that anodic temperature can be controlled by selection of anode materials or in the case of a mixture of metals, molten salts, and/or molten oxides, composition and percentages of the respective components, i.e., composition can affect the melting point of the anode. Other non-limiting exemplary operating temperature ranges include a temperature between about 300° C. to about 1500° C., between about 500° C. to about 1300° C., between about 500° C. to about 1200° C., between about 500° C. to about 1000° C., between about 600° C. to about 1000° C., between about 700° C. to about 1000° C., between about 800° C. to about 1000° C., between about 500° C. to about 900° C., between about 500° C. to about 800° C., between about 600° C. to about 800° C., etc.

In some embodiments, the anode can be a pure liquid or can have solid and liquid components, so long as the anode as a whole exhibits liquid- or fluid-like properties. In some cases, the anode can have the consistency of a paste or a highly viscous fluid. Where the anode is a metal, it can consist essentially of a pure metal or can comprise an alloy comprising two or more metals. In one set of embodiments, the anodic material is selected so as to have a standard reduction potential greater than $-0.70$ V versus the Standard Hydrogen Electrode (determined at room temperature). These values can be obtained from standard reference materials, or measured by using methods known to those of ordinary skill in the art. The anode can comprise any one or more than one of a transition metal, a main group metal, and combinations thereof. Metals such as copper, molybdenum, mercury, iridium, palladium, antimony, rhenium, bismuth, platinum, silver, arsenic, rhodium, tellurium, selenium, osmium, gold, lead, germanium, tin, indium, thallium, cadmium, gadolinium, chromium nickel, iron, tungsten, cobalt, zinc, vanadium, or combinations thereof, can also be useful. Examples of alloys include, but are not limited to, 5% lead with reminder antimony, 5% platinum with reminder antimony, 5% copper with reminder indium, 20% lead, 10% silver, 40% indium, 5% copper. In another set of embodiments, the liquid anode of the electrochemical device may include a molten salt, such as carbonates, sulfates, chlorides, fluorides, phosphates and nitrates, and/or a molten oxide, such as antimony oxide, and/or combinations thereof.

Although liquid anodes are more commonly used in the invention (e.g., liquid metal, molten salt, molten oxides, etc.), solid anodes can be used as well, including metals such as main group metals, transition metals such as nickel, lanthanides, actinides, ceramics (optionally doped with any metal listed herein). Indeed, any suitable anode may be used with the present invention. Other suitable solid anodes are disclosed in references incorporated herein.

The cathode of the device typically (but not always) is a solid-state cathode, e.g. a ceramic, a metal oxide, and/or a mixed metal oxide. Specific, non-limiting examples include tin-doped $In_2O_3$, aluminum-doped zinc oxide, zirconium-doped zinc oxide, lanthanum-calcium-manganese oxide, or lanthanum-strontium-manganese oxide. Another example of a solid state cathode is a perovskite-type oxide having a general structure of $ABO_3$, where "A" and "B" represent two cation sites in a cubic crystal lattice. A specific example of a perovskite-type oxide has a structure $La_xMn_yA_aB_bC_cO_d$ where A is an alkaline earth metal, B is selected from the group consisting of scandium, yttrium and a lanthanide metal, C is selected from the group consisting of titanium, vanadium, chromium, iron, cobalt, nickel, copper, zinc, zirconium, hafnium, aluminum and antimony, x is from 0 to about 1.05, y is from 0 to about 1, a is from 0 to about 0.5, b is from 0 to about 0.5, c is from 0 to about 0.5 and d is between about 1 and about 5, and at least one of x, y, a, b and c is greater than zero.

More specific examples of perovskite-type oxides include, but are not limited to, $LaMnO_3$, $La_{0.84}Sr_{0.16}MnO_3$, $La_{0.84}Ca_{0.16}MnO_3$, $La_{0.84}Ba_{0.16}MnO_3$, $La_{0.65}Sr_{0.35}Mn_{0.8}CO_{0.2}O_3$, $La_{0.79}Sr_{0.16}Mn_{0.85}CO_{0.15}O_3$, $La_{0.84}Sr_{0.16}Mn_{0.8}Ni_{0.2}O_3$, $La_{0.84}Sr_{0.16}Mn_{0.8}Fe_{0.2}O_3$, $La_{0.84}Sr_{0.16}Mn_{0.8}Ce_{0.2}O_3$, $La_{0.84}Sr_{0.16}Mn_{0.8}Mg_{0.2}O_3$, $La_{0.84}Sr_{0.16}Mn_{0.8}Cr_{0.2}O_3$, $La_{0.6}Sr_{0.35}Mn_{0.8}Al_{0.2}O_3$, $La_{0.84}Sc_{0.16}MnO_3$, $La_{0.84}Y_{0.16}MnO_3$, $La_{0.7}Sr_{0.3}Co_{0.3}$, $LaCoO_3$, $La_{0.7}Sr_{0.3}FeO_3$, $La_{0.5}Sr_{0.5}CO_{0.8}Fe_{0.2}O_3$, $La_{0.84}Sr_{0.16}MnO_3$, or other LSM materials. As used herein, "LSM" refers to any lanthanum-strontium-manganese oxide, such as $La_{0.84}Sr_{0.16}MnO_3$.

In other embodiments, the ceramic may also include other elements, such as titanium, tin, indium, aluminum, zirconium, iron, cobalt, manganese, strontium, calcium, magnesium, barium, and/or beryllium. Other examples of solid state cathodes include $LnCoO_3$, $LnFeO_3$, $LnCrO_3$, and a $LnMnO_3$-based perovskite oxide cathode, such as $Ln_{0.75}Sr_{0.25}CrO_3$, $(Ln_{0.6}Sr_{0.4})_{0.9}CrO_3$, $Ln_{0.6}Sr_{0.4}FeO_3$, $Ln_{0.6}Sr_{0.4}CoO_3$, or $Ln_{0.6}Sr_{0.4}CoO_3$, where Ln may be any one of La, Pr, Nd, Sm, or Gd. Alternatively, the cathode may comprise a metal; for example, the cathode may comprise a noble metal. Examples of metals useful in cathodes include any one or more than one of platinum, palladium, gold, silver, copper, rhodium, rhenium, iridium, osmium, and combinations thereof.

In some cases, the cathode, optionally including any associated current collector, is constructed to define one or more channels for flow of a gas, for example, as discussed in a U.S. provisional patent application filed on even date herewith, entitled "Electrode Arrangements for Fuel Cells and other Applications," by T. Tao, incorporated herein by reference. Additionally, the cathode (including any associated current collector) may be positioned in the center of an electrolyte (discussed in detail below), in some embodiments of the invention. For instance, the geometrical center of the electrolyte may be contained within the cathode.

Current collectors can be selected to adequately deliver or remove electrical current to or from an electrode and/or other like components, to operate effectively at typical device temperatures, and/or to be adequately resistant to conditions within the device that can cause chemical degradation to non-resistant materials. Non-limiting examples include silver, gold, and/or platinum as a cathode current collector. Other non-limiting examples are discussed below. A wide variety of useful current collectors are described in International Patent Application No. PCT/US03/03642, filed Feb. 6, 2003, entitled "Current Collectors," by T. Tao, et al., published as WO 03/067683 on Aug. 14, 2003, incorporated herein by reference.

In one arrangement, a current collector includes a sheathing material, a core, and an electrical lead in contact with the core. The sheathing material may define a shell surrounding at least a portion of the core. The core may be, for example a metal, for example, copper, nickel, steel, or a noble metal. Other non-limiting examples of metals useful in cathodes include any one or more than one of platinum, palladium, gold, silver, copper, rhodium, rhenium, iridium, osmium, and combinations thereof. As another example, a core may comprise a liquid metal (metal or alloy that is a liquid under typical operating conditions within an interior space of the sheathing material, and an electrical lead in contact with the liquid metal. Liquid metals can be selected from among, for example, copper, iridium, palladium, antimony, rhenium, bismuth, platinum, silver, arsenic, rhodium, tellurium, selenium, osmium, gold, lead, germanium, tin, indium, thallium, cadmium, nickel, iron, cobalt, zinc, and/or alloys thereof.

Examples of sheathing material include, but are not limited to, electrically conducting ceramics such as oxides of scandium, indium, a lanthanide, yttrium, titanium, tin, indium, aluminum, zirconium, iron, cobalt, manganese, strontium, calcium, magnesium, barium, beryllium, a lanthanide, chromium, and mixtures thereof, such as an LSC or an LCC. As used herein, "LCC" refers to any lanthanum-calcium-chromium oxide. Other, non-limiting examples of sheathing materials include ceramics made of W—C, Si—C, Si—N, etc.

Combinations of any of the above compounds are also possible (for the core and/or the sheathing material), such as alloys of any of the above metals, which may include combinations of the above metals or combinations with other metals as well. One example is a platinum-silver alloy having any suitable ratio, for example, 5% Pt:95% Ag, 10% Pt:90% Ag, 20% Pt:80% Ag, or the like.

In some embodiments, the electrically conducting material and/or the sheathing material may be a heterogeneous material formed from a mixture of materials. The mixture may be a mixture including any one of the materials previously described, for example, a ceramic mixture, a metal mixture, or a cermet mixture, where a "cermet" is a mixture of at least one metal compound and at least one ceramic compound, for example, as previously described. As one example, the cermet may include a material such as copper, silver, platinum, gold, nickel, iron, cobalt, tin, and/or indium, and a ceramic such as zirconium oxide, an aluminum oxide, an iron oxide, a nickel oxide, a lanthanum oxide, a calcium oxide, a chromium oxide, a silicate, and/or a glass. Combinations of any of these materials are also contemplated. Additionally, other materials may be incorporated in the cermet, for example, graphite. Suitable cermet mixtures may include, for example, Cu/YSZ, $NiO/NiFe_2O_4$, $NiO/Fe_2O_3/Cu$, Ni/YSZ, Fe/YSZ, Ni/LCC, Cu/YSZ, $NiAl_2O_3$, or $Cu/Al_2O_3$. A "YSZ," as used herein, refers to any yttria-stabilized zirconia material, for example, $(ZrO_2)(HfO_2)_{0.02}(Y_2O_3)_{0.08}$, or others as described herein.

The electrolyte of the device can be selected to allow conduction of ions between the cathode and anode, typically the migration or transport of oxygen ions (e.g., $O^=$ or $O^{2-}$). Solid state and/or ceramic electrolytes can be used, and non-limiting examples include metal oxides and mixed metal oxides. An example of a solid state electrolyte is an electrolyte having a formula $(ZrO_2)(HfO_2)_a(TiO_2)_b(Al_2O_3)_c(Y_2O_3)_d(M_xO_y)_e$ where a is from 0 to about 0.2, b is from 0 to about 0.5 c is from 0 to about 0.5, d is from 0 to about 0.5, x is greater than 0 and less than or equal to 2, y is greater than 0 and less than or equal to 3, e is from 0 to about 0.5, and M is selected from the group consisting of calcium, magnesium, manganese, iron, cobalt, nickel, copper, and zinc. More specifically, non-limiting examples of solid state electrolytes include $(ZrO_2)$, $(ZrO_2)(Y_2O_3)_{0.08}$, $(ZrO_2)(HfO_2)_{0.02}(Y_2O_3)_{0.08}$, $(ZrO_2)(HfO_2)_{0.02}(Y_2O_3)_{0.05}$, $(ZrO_2)(HfO_2)_{0.02}(Y_2O_3)_{0.08}(TiO_2)_{0.10}$, $(ZrO_2)(HfO_2)_{0.02}(Y_2O_3)_{0.08}(Al_2O_3)_{0.10}$, $(ZrO_2)(Y_2O_3)_{0.08}(Fe_2O_3)_{0.05}$, $(ZrO_2)(Y_2O_3)_{0.08}(CoO)_{0.05}$, $(ZrO_2)(Y_2O_3)_{0.08}(ZnO)_{0.05}$, $(ZrO_2)(Y_2O_3)_{0.08}(NiO)_{0.05}$, $(ZrO_2)(Y_2O_3)_{0.08}(CuO)_{0.05}$, $(ZrO_2)(Y_2O_3)_{0.08}(MnO)_{0.05}$ and $ZrO_2CaO$. Other examples of solid state electrolytes include, but are not limited to, a YSZ; a $CeO_2$-based perovskite, such as $Ce_{0.9}Gd_{0.1}O_2$ or $Ce_{1-x}Gd_xO_2$, where x is no more than about 0.5; lanthanum-doped ceria, such as $(CeO)_{1-n}(LaO_5)_n$, where n is from about 0.01 to about 0.2; a $LaGaO_3$-based perovskite oxide, such as $La_{1-x}A_xGa_{1-y}B_yO_3$ where A can be Sr or Ca, B can be Mg, Fe, Co and x is from about 0.1 to about 0.5 and y is from about 0.1 to about 0.5 (e.g. $La_{0.9}Sr_{0.1}Ga_{0.8}Mg_{0.2}O_3$); a $PrGaO_3$-based perovskite oxide electrolyte, such as $Pr_{0.93}Sr_{0.07}Ga_{0.85}Mg_{0.15}O_3$ or $Pr_{0.93}Ca_{0.07}Ga_{0.85}Mg_{0.15}O_3$; or a $Ba_2In_2O_5$-based perovskite oxide electrolyte, such as $Ba_2(In_{1-x}Ga_x)_2O_5$ or $(Ba_{1-x}La_x)In_2O_5$, where is x is from about 0.2 to about 0.5. As another example, the electrolyte may comprise an LSM material, such as those described herein. In some cases, the electrolyte is electronically conducting.

A wide variety of fuels can be used, and the fuel may be reformed or unreformed. Generally, the fuel will be gasified at least one step of the process. Non-limiting examples of classes of fuels include a carbonaceous material; sulfur; a sulfur-containing organic compound such as thiophene, thiourea and thiophenol; a nitrogen-containing organic compound such as nylon and a protein; ammonia, hydrogen and mixtures thereof. Typically, the fuel selected for the device is application dependent. Non-limiting examples of a fuel comprising a carbonaceous material include, but are not limited to, conductive carbon, graphite, quasi-graphite, coal, coke, charcoal, fullerene, buckminsterfullerene, carbon black, activated carbon, decolorizing carbon, a hydrocarbon, an oxygen-containing hydrocarbon, carbon monoxide, fats, oils, a wood product, a biomass and combinations thereof. Examples of a hydrocarbon fuel include, but are not limited to, saturated and unsaturated hydrocarbons, aliphatics, alicyclics, aromatics, and mixtures thereof. Other examples of hydrocarbons include gasoline, diesel, kerosene, methane, propane, butane, natural gas, plastics, rubbers, and mixtures thereof. Non-limiting examples of oxygen-containing hydrocarbon fuels include alcohols which further include $C_1$-$C_{20}$ alcohols and combinations thereof. Specific examples include methanol, ethanol, propanol, butanol and mixtures thereof. However, almost all oxygen-containing hydrocarbon fuels capable of being oxidized by the anode materials disclosed herein may be used so long as the fuel is not explosive or does not present any danger at operating temperatures. Gaseous fuels such as hydrogen and SynGas (a mixture of hydrogen and carbon monoxide) may also be used in certain embodiments of the invention.

The fuel supplied to the device may be delivered in any manner that provides sufficient fuel to the needed locations. The nature of the fuel delivery may vary with the type of fuel. For example, solid, liquid, and gaseous fuels may all be introduced in different manners. A variety of fuel delivery options useful with liquid anodes are disclosed in International Patent Application No. PCT/US02/37290, filed Nov. 20, 2002, entitled "An Electrochemical System and Methods for Control Thereof," by T. Tao, et al., published as WO 03/044887 on May 30, 2003, incorporated herein by reference. The fuel delivery techniques taught by this reference may be modified to supply fuel to a porous separator, or directly to the anode. For example, in the embodiment illustrated in FIG. 1, fuel 14 is exposed directly to outer container 16, which may be a porous separator, as discussed herein.

In some embodiments of the invention, the electrochemical device is capable of operating with more than one type of fuel. The vast majority of prior art fuel cells are designed to operate with a specific fuel type, usually hydrogen and less often methanol. This aspect of the invention makes it possible to capitalize on the benefits of different fuel types. For example, one type of fuel may provide a higher power output whereas another may provide a lower power output but affords lightweight properties. Enhanced performance may be achieved with one type of fuel, yet another type of fuel recharges the anode more efficiently. Other benefits for using different fuel types may be realized, for example, in situations where the price of one fuel type rises and economics dictate the use of a cheaper fuel. Environmental concerns may also be a deciding factor in changing the fuel type. Short term benefits may be realized, for example, in the situation where the supply of one fuel type is exhausted and only another fuel type is readily available.

The fuel may be delivered in such a manner as to inhibit or not inhibit clogging or coking. One particular embodiment of this invention is directed to the delivery of fuel into fuel cell stack without/fuel reforming or processing without inhibit clogging or coking. Other potentially suitable strategies for reducing coking are disclosed in International Patent Application No. PCT/US02/37290, filed Nov. 20, 2002, entitled "An Electrochemical System and Methods for Control Thereof," by T. Tao, et al., published as WO 03/044887 on May 30, 2003, incorporated herein by reference. Fuel which is prone to coking may also be reformed, in some embodiments, prior to introduction into the electrochemical device.

The fuel may react with an oxidant within the device. The oxidant can be selected from species that will serve as oxidizing agent during operation, such as air, pure oxygen or an oxygen-containing gas, at atmospheric pressures or greater or lesser.

The fuel may be oxidized, in part, using a porous separator, according to certain embodiments of the invention. The separator is any article that can be positioned, relative to the fuel and the anode, such that the anode and fuel are able to communicate chemically across the separator, facilitating oxidation of the fuel. In one embodiment, the separator operates to allow connection between fuel and anode physically. The separator can be semi or fully porous. That is, the separator can include pores allowing contact directly between fuel and anode, but not bulk flow of anode into the fuel. Increasing the effective area and flow path for interaction may be performed physically by providing a framework that improves the interfacial area between the anode and fuel. Thus, in one such embodiment, a separator may comprise an open structure through which the anode and fuel can contact one another; for example, the separator may be porous. As used herein, "porous" means containing a plurality of openings; this definition includes both regular and irregular openings, as well as openings that generally extend all the way through a structure as well as those that do not (e.g., interconnected, or "open" pores, as opposed to at least partially non-connected, or "closed" pores). Thus, an interconnected porous structure is one where a significant fraction of the pores extends all the way through the structure.

As used herein, "bulk flow" means bulk movement of one species into another species or compartment, e.g., where a liquid anode and gaseous fuel are prevented from flowing into each other or into each other's compartment, the gaseous fuel does not bubble into the liquid anode, and/or the liquid anode does not penetrate the separator and/or flow into the fuel compartment. The meaning of "flow" herein does not, however, exclude diffusion. For instance, gaseous fuel may diffuse into a liquid anode, e.g., fuel molecules can become dissolved or dispersed within the liquid anode, although there may be no substantial bulk movement of gaseous fuel within the anode (e.g., bubbles). In another embodiment, gaseous fuel may be allowed to actually flow through the separator and bubble into a liquid anode, but the anode material is prevented from bulk flowing into the fuel.

Porous separators may take many forms. Examples of materials suitable for porous separators are refractive materials, described in a U.S. provisional patent application filed on even date herewith, entitled "Porous Ceramic Materials," by T. Tao, et al.; each incorporated herein by reference. In some cases, the separator has a porosity (by volume) of at least about 50%, at least about 70%, at least about 75%, or at least about 80% (where the percentages indicate void volume within the ceramic), or the separator has an average pore size of less than about 300 micrometers, for instance, less than about 100 micrometers, between about 1 micrometer and about 200 micrometers, between about 50 micrometers and about 200 micrometers, or between about 100 micrometers and about 200 micrometers. The average pore size may be determined, for example, from density measurements, from optical and/or electron microscopy images, or from porosimetry, e.g., by the intrusion of a non-wetting liquid (often mercury) at high pressure into the material, and is usually taken as the number average size of the pores present in the material. In some cases, the separator comprises or consists essentially of a ceramic such as a refractive ceramic, for example, $Al_2O_3$, $ZrO2$, or alumina silicate. In certain embodiments, the separator has a permissivity to air of at least about 0.1 $cm^3$/min cm/psi (under standard conditions, i.e., standard temperature or pressure), at least about 0.3 $cm^3$/min cm/psi, at least about 1 $cm^3$/min cm/psi, at least about 5 $cm^3$/min cm/psi, or at least about 1000 $cm^3$/min cm/psi. One method of determining permissivity is to measure a flow rate (in $cm^3$/min) of a flowing media such as air or oxygen passing through a sample (e.g., a porous ceramic) having a known thickness (cm) and cross sectional area ($cm^2$) under a given pressure (psi, 1 psi=6.89475 kPa).

The separator can be any structure or material that can place the anode and fuel in oxidative communication, i.e., an arrangement in which the anode can promote oxidation of the fuel. Various purposes served by the separator can include improving fuel efficiency or power output, maximizing surface area between fuel and anode at which oxidation can occur (where fuel and anode are allowed to physically contact each other), defining a portion of a fuel compartment (manifold), defining a portion of an anode compartment (e.g., as is shown in FIG. 1), and/or other functions.

For instance, fuel separators of the invention can define portions of fuel cell components. For example, in one embodiment, a fuel separator can define a portion of an anode compartment that can at least partially contain a fluid anode within the compartment. The separator, in another embodiment, similarly can define a portion of a fuel compartment (and/or a fuel conduit or a manifold), and/or can serve to at least partially contain a fuel or an anode. The separator can serve as part of the fuel compartment and/or as part of the anode compartment. It can also serve as the sole fuel cell component separating the fuel from the anode, at least one location, i.e., it can define a wall that is between and is in contact with both the fuel and the anode.

The separator may be constructed of any material or materials that are able to be formed into the desired structure, and/or have the desired conductivity, and/or are sufficiently durable for use in the intended operating conditions of the electrochemical device. As noted above, the separator may be porous. The separator may also include a catalyst that lowers the activation energy for oxidation of fuel, and/or reforming of fuel, and/or catalyzes the well-known water-shift reaction. Those of ordinary skill in the art are capable of selecting suitable catalysts for these purposes, and immobilizing them on a substrate defined by the separator. Non-limiting examples include cerments of platinum, ruthenium, nickel, and/or copper, and doped or undoped cerium oxides.

The separator may be constructed and arranged to be integrated with other fuel cell components, and can promote oxidation of the fuel by the anode. Those of ordinary skill in the art will understand how a separator of the invention can be "constructed and arranged" to be integrated with other fuel cell components, in a wide variety of fuel cell arrangements, or arrangements of other electrochemical devices. For example, the separator can include integral or attached seals, brackets, flanges, passages for receiving fasteners, and/or can be fabricated so as to be easily modifiable with these or other components.

In some embodiments, a separator may be constructed of one or more ceramic materials. YSZ is one suitable composition for use in a separator in certain embodiments. YSZ may be useful in embodiments where physical contact between the anode and fuel is desired. Another suitable ceramic material is alumina. Those of ordinary skill in the art will recognize other materials suitable for use in fabrication of the separator. Where these materials are used solely, they typically will allow physical contact between fuel and anode, for example via the porous arrangement described above.

The separator of the invention, and other electrochemical device components will at times be described in the context of "operating conditions of the fuel cell," or "normal fuel cell operation." These phrases will be understood by those of ordinary skill in the art, and refer to use of an electrochemical device or system under conditions for which it was intended and/or designed it to be used, or under conditions for which it would forseeably be used, for example, to generate electrical current via consumption of a fuel and/or recharging of a chemically-rechargeable electrode, as described in International Patent Application No. PCT/US01/12616, filed Apr. 18, 2001, entitled "An Electrochemical Device and Methods for Energy Conversion," by T. Tao, et al., published as WO 01/80335 on Oct. 25, 2001, incorporated herein by reference. These operating conditions can involve temperatures and/or voltages selected for effective and efficient fuel cell operation, including temperatures at which a metal anode is in a liquid state. Some arrangements of the invention will be described in which a "substantial portion" of an anode is a fluid, e.g., liquid, state (some anode materials suitable for use in the invention will include some gaseous material as well). "Substantial portion," when used in this context, means that a majority of the entire anode is in the recited state, under normal operating conditions of the fuel cell. Where a "substantial portion" of the fuel is a gas, this means, similarly, that a majority of the fuel is in the gaseous state.

Various components, conduits, and/or manifolds of the device, as discussed herein (including interconnecting electric and/or fuel management systems defining panels and stacks, and interconnections therebetween), can be constructed of ceramic, stainless steel, other metals such as copper, or other high-temperature steel, chromium and/or cobalt alloys, or essentially any material that will not destructively interfere with the device or be easily corroded. Other commercial alloys including iron, chrome, nickel, cobalt, and/or other spices may be useful, such as Inconnels™. These components typically are constructed of non-reactive materials, that is, materials that do not participate in any electrochemical reaction occurring in the device. In certain embodiments, the interior surfaces of conduits can be coated with an anti-coking agent, and/or a conduit can be constructed at least in part of an anti-coking agent, as described in International Patent Application No. PCT/US02/37290, filed Nov. 20, 2002, entitled "An Electrochemical System and Methods for Control Thereof," by T. Tao, et al., published as WO 03/044887 on May 30, 2003, incorporated herein by reference. Of course, all components should be fabricated of material selected to operate effectively at the intended temperature (and temperature variation) to which the device will be exposed.

Components for the present invention can also be selected as described in the following documents, each incorporated herein by reference: International Patent Application No. PCT/US99/04741, filed Mar. 3, 1999, entitled "A Carbon-Oxygen Electricity-Generating Unit," by T. Tao, et al., published as WO 99/45607 on Sep. 10, 1999; International Patent Application No. PCT/US01/12616, filed Apr. 18, 2001, entitled "An Electrochemical Device and Methods for Energy Conversion," by T. Tao, et al., published as WO 01/80335 on Oct. 25, 2001; U.S. patent application Ser. No. 09/819,886, filed Mar. 28, 2001, entitled "A Carbon-Oxygen Fuel Cell," by T. Tao, published as U.S. Patent Application Publication No. 2002/0015877 on Feb. 7, 2002, now U.S. Pat. No. 6,692,861, issued Feb. 17, 2004; International Patent Application No. PCT/US02/37290, filed Nov. 20, 2002, entitled "An Electrochemical System and Methods for Control Thereof," by T.

Tao, et al., published as WO 03/044887 on May 30, 2003; International Patent Application No. PCT/US03/03642, filed Feb. 6, 2003, entitled "Current Collectors," by T. Tao, et al., published as WO 03/067683 on Aug. 14, 2003; and International Patent Application No. PCT/US02/20099, filed Jun. 25, 2002, entitled "Electrode Layer Arrangements in an Electrochemical Device," by T. Tao, et al., published as WO 03/001617 on Jan. 3, 2003.

Figure 3:
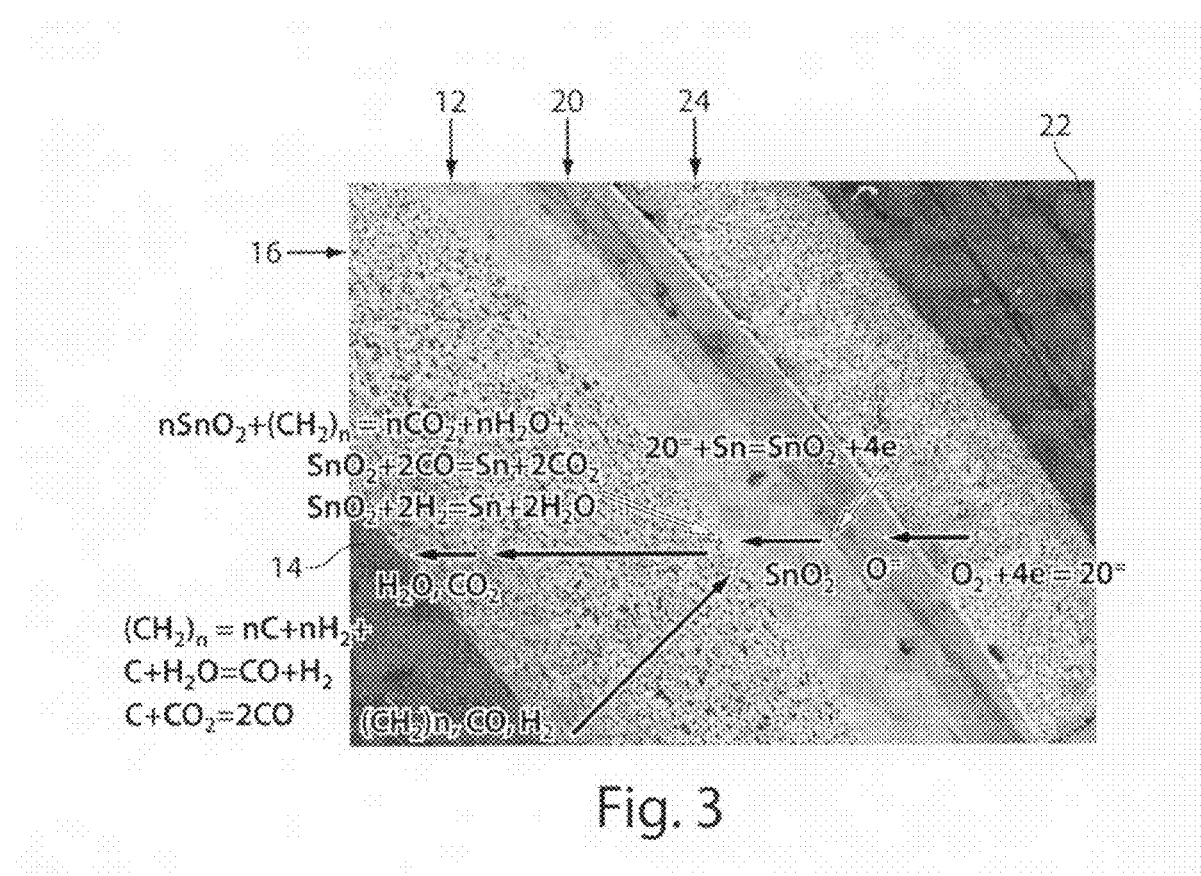
FIG. 3 is a diagram indicating electrochemical and chemical reactions that can occur in one embodiment of the invention.

Without wishing to be bound by any theory, it is believed that the reactions shown in FIG. 3 occur during use of the device. FIG. 3 shows an SEM image of portion of one embodiment of the device, including a porous container (the separator) 16, an anode 12 (here, tin), an electrolyte 20, a cathode 24, and air contained within an air conduit 22. Also shown in FIG. 3 is a space (an anode chamber) that contains a fuel 14. It is believed that oxygen ($O_2$) in air, upon contacting cathode 24 which can provide electrons, reacts as follows:

$$O^2 + 4e^- \rightarrow 2O^=.$$

The ionized $O^=$ then is able to cross cathode 24 and electrolyte 20 to reach anode 12. Anode 12, which contains liquid tin, reacts with the ionized oxygen to produce tin oxides (SnO, $SnO_2$, etc.), releasing electrons if connected, which may form a circuit. Tin oxide can diffuse across the anode to reach porous container 16. Porous container 16 can be chosen to allow fuel 14 from a fuel source (anode chamber) to diffuse across (or otherwise be transported across). As the devices in this invention can use any of a wide variety of fuels, as discussed above, in FIG. 3, the fuel is represented by various species, including $(CH_2)_n$, CO, C, or $H_2$. Reactions of $SnO_2$ and fuel proceed, e.g., as follows:

$$n\ SnO_2 + (CH_2)_n \rightarrow n\ CO_{2+n} H_2O + \ldots + Sn$$

$$SnO_2 + 2CO \rightarrow Sn + 2CO_2$$

$$SnO2 + 2H_2 \rightarrow Sn + 2H_2O$$

$$SnO_2 + C \rightarrow Sn + CO_2$$

Other reactions (e.g., with sulfur- or nitrogen-containing compounds) can proceed similarly. It should be noted that, in many of these reactions, $SnO_2$ (and SnO, etc.) is converted back to Sn completing the fuel cell cycle.

It is believed that fuel 14 is able to diffuse across porous container 16 in order to reach anode 12. While gases such as CO or $H_2$ may readily diffuse across porous container 16, in the case of other fuels, such as heavy hydrocarbons, at least some portion of the fuels may diffuse across. In the case of other fuels, such as carbon or hydrocarbons, such fuels may be readily thermally broken down to form soot, and gaseous $H_2$, CO, etc. may form in situ the anode chamber, e.g., via shifting reactions. It should be noted that such combustion reactions have not necessarily all been precisely characterized, and multiple reactions may occur during combustion simultaneously. Thus, for example, reactions such as the following may occur with the fuel, which allows fuel reaction with the anode to occur:

$$(CH_2)_n \rightarrow n\ C + n\ H_2 + \ldots$$

$$C + H_2O \rightarrow CO + H_2$$

$$C + CO_2 \rightarrow 2CO$$

It should be noted that many of these reactions involve C. While in many other prior art devices, C generally deposits as soot and is undesirable, in the inventions discussed herein, C itself may be used as a fuel source (e.g., to generate CO and/or $H_2$), and thus, in many cases, coking, soot production and/or particulate formation does not cause device failure to occur, as any coking, soot, or the like (e.g., carbon deposition) is merely another fuel source for the device. Similarly, contaminants often found in fuel, e.g., S or N, can also be oxidized in the device (e.g., to produce $SO_2$ or $NO_2$, or other $SO_x$ or $NO_x$ compounds), and thus, unlike many prior art devices, S or N is not seen as a contaminant. Thus, the device as described herein can use both reformed and unreformed fuel. For example, fuels containing high amounts of sulfur, such as JP-8 (a kerosene-based jet fuel, specified by MIL-DTL-83133, although this fuel can be used for other purposes as well), may be used in the device, e.g., without reforming or removal of sulfur.

Figure 4:
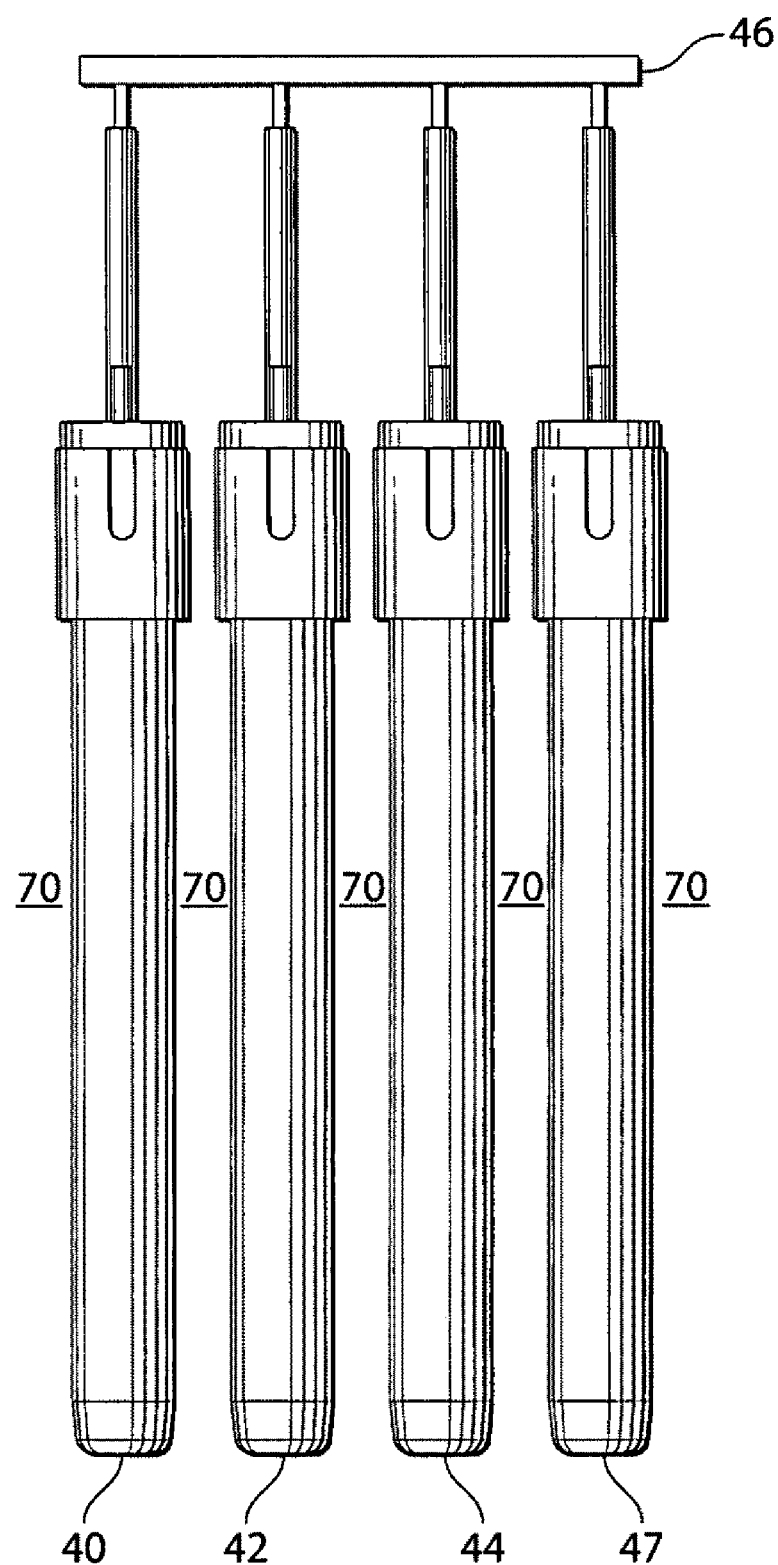
FIG. 4 shows four units of the general type illustrated in FIG. 1, interoperatively linked together via apparatus according to one embodiment of the invention.

Reference will now be made to the example of FIG. 4. At the outset, it is noted that FIG. 4 illustrates a series of chemical or fuel-rechargeable energy conversion units including, in some cases, a different number of units per interconnected device, devices including units of different scale and/or units of different size. In this figure, all cells share the same anode chamber, thus making the fuel cell stack suitable for converting common fuels directly into electricity without additional fuel reforming. This is representative of the fact that the systems and techniques of the present invention are applicable to a wide variety of electrochemical devices, linkage of different numbers of electrochemical devices, etc. Referring now to FIG. 4, a plurality of fuel-to-energy conversion devices, specifically, chemical or fuel-rechargeable energy conversion units 40, 42, 44, and 47 form part of an interconnected system of the invention. Each of units 40, 42, 44, and 47 is essentially as described above with respect to FIG. 1, and is linked to an interconnecting air management system 46 (e.g., a "unitary manifold structure"). System 46 can comprise essentially any structural arrangement or interconnected system of components that serves the function of either providing additional structural support to a plurality of chemical or fuel-rechargeable energy conversion units, or a manifold for providing oxidant (e.g., air) to a plurality of units or removing exhaust gas, or any combination of these. As illustrated in the following figures and described below, system 46 can be embodied in a "panel" which interconnects a plurality of units, optionally linked to other, similar panels to form a "stack" of panels. In FIG. 4, a single, four-unit panel is illustrated schematically. It is to be understood that an interconnecting system or panel of the invention can be constructed and arranged to address any number of units including two units, three, four, five, six, seven, or more units. Surrounding units 40, 42, 44, and 47 is fuel 70, contained within an anode chamber (not shown), which may be any fuel, e.g., as described herein.

Figure 5:
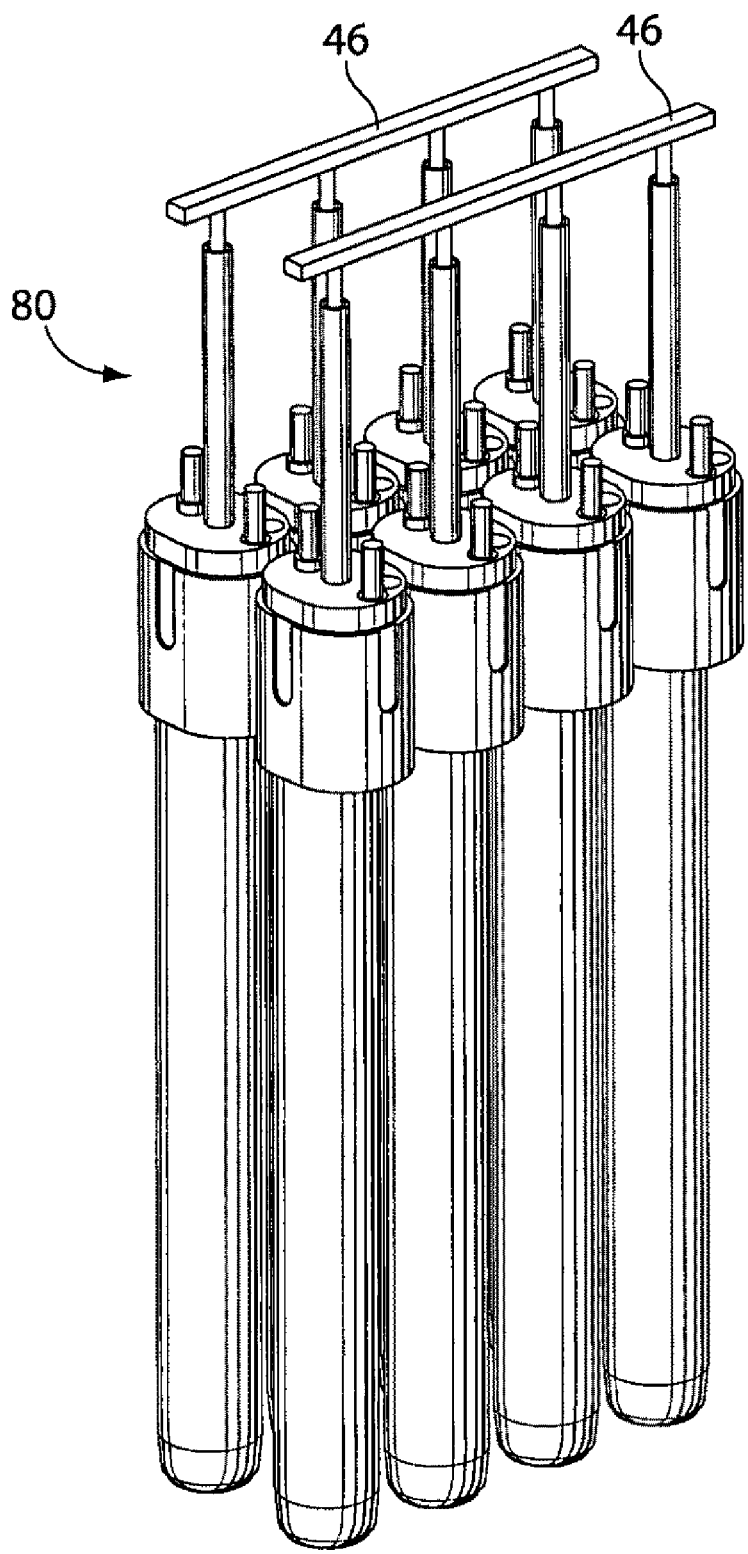
FIG. 5 shows a plurality of two systems of FIG. 4, interoperatively linked.

Stack 80 of FIG. 5 is a system of electrochemical devices including at least one, and generally a plurality of devices (which, like other devices herein, can be fuel-to-energy conversion devices such as chemical or fuel-rechargeable energy conversion units), where the system comprises a plurality of separately-manufactured components (panels 46) that are not isolated conduits, interconnected at inter-component junctions. An "isolated conduit," of which the immediately-preceding junctions are not, is meant herein to define a generally elongated, typically tubular structure having an interior connecting a first end thereof to a second end thereof and a surrounding exterior, whose purpose it is to conduct fluid from the first end to the second end. In some cases, stack 80 may be contained within a housing, and in some embodiments, the housing may contain fuel therein.

In operation, a panel 46, including 2, 3, 4, 5, 6, 7, 8, 9, 10, or any number of individual devices, and/or a stack 80 including 2, 3, 4, 5, 6, 7, 8, 9, or any number of panels 46 as described, can be placed within a heating unit, or oven, within which fuel may be introduced to bathe the exterior of the devices. The heating unit may be desirably set at a predetermined temperature for optimal device operation. The temperature can be selected to promote the most efficient device operation, to bring any components into liquid form that are designed to be in liquid form during device operation, or the like. A heating unit or oven can readily be constructed by those of ordinary skill in the art, for the purposes and arrangements described herein. Specific heating units are not described or shown.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A fuel cell, comprising:
    an anode, a portion of which is fluid during operation of the fuel cell;
    a porous container able to contain the anode during operation of the fuel cell;
    an electrolyte at least partially contained within the anode; and
    a cathode at least partially contained within the electrolyte;
        wherein the porous container is permeable to fuel and impermeable to the anode when the anode is fluid.

2. The fuel cell of claim 1, the fuel cell comprising a plurality of anodes, each anode contained within a common anode chamber.

3. The fuel cell of claim 1, wherein the anode comprises a metal.

4. The fuel cell of claim 1, wherein the anode comprises tin.

5. The fuel cell of claim 1, wherein the anode consists essentially of tin.

6. The fuel cell of claim 1, wherein the porous container has an air permissivity of at least about 0.1 $cm^3$/min cm/psi.

7. The fuel cell of claim 1, wherein the porous container has a porosity of at least about 50%.

8. The fuel cell of claim 7, wherein the porous container has a porosity of at least about 70%.

9. The fuel cell of claim 8, wherein the porous container has a porosity of at least about 75%.

10. The fuel cell of claim 1, wherein the porous container has an average pore size of no more than about 300 micrometers.

11. The fuel cell of claim 10, wherein the porous container has an average pore size of between about 50 micrometers and about 200 micrometers.

12. The fuel cell of claim 10, wherein the porous container has an average pore size of no more than about 100 micrometers.

13. The fuel cell of claim 11, wherein the porous container has an average pore size of between about 100 micrometers and about 200 micrometers.

14. The fuel cell of claim 1, wherein the porous container is cylindrical.

15. The fuel cell of claim 1, wherein the porous container comprises a ceramic.

16. The fuel cell of claim 1, wherein the porous container consists essentially of a ceramic.

17. The fuel cell of claim 1, wherein the porous container comprises $Al_2O_3$.

18. The fuel cell of claim 1, wherein the porous container comprises $ZrO_2$.

19. The fuel cell of claim 1, wherein the porous container comprises alumina silicate.

20. The fuel cell of claim 1, wherein the porous container physically separates a fuel from the anode when the anode is fluid.

21. The fuel cell of claim 1, wherein the electrolyte comprises a ceramic.

22. The fuel cell of claim 1, wherein the electrolyte is ionically conductive.

23. The fuel cell of claim 1, wherein the electrolyte transports $O^{2-}$.

24. The fuel cell of claim 1, wherein the electrolyte comprises a yttria-stabilized zirconia.

25. The fuel cell of claim 1, wherein the cathode contains therein a channel able to transport a gas.

26. The fuel cell of claim 1, wherein the cathode is positioned substantially in the center of the electrolyte.

27. The fuel cell of claim 1, wherein the geometrical center of the electrolyte is contained within the cathode.

28. The fuel cell of claim 1, wherein the cathode comprises a ceramic.

29. The fuel cell of claim 1, wherein the cathode comprises a lanthanum-strontium-manganese oxide.

30. The fuel cell of claim 1, wherein the fuel cell contains a hydrocarbon fuel.

31. The fuel cell of claim 1, wherein the fuel cell contains an unreformed fuel.

32. A fuel cell, comprising:
a tin anode;
a ceramic porous container containing the tin anode;
a ceramic electrolyte at least partially contained within the anode; and
a cathode at least partially contained within the electrolyte, wherein the tin is liquid during operation of the fuel cell;
wherein the porous container is permeable to fuel and impermeable to the anode when the anode is fluid.

33. An electrochemical device, comprising:
a plurality of fuel cells, each fuel cell comprising an anode, a portion of which is fluid during operation of the fuel cell, and a porous container able to contain the anode during operation of the fuel cell; wherein the porous container is permeable to fuel and impermeable to the anode when the anode is fluid; and
a housing containing the plurality of fuel cells, the housing connectable to a source of fuel.

34. The device of claim 33, wherein each fuel cell further comprises an electrolyte contained within the anode, and a cathode contained within the electrolyte.

35. The fuel cell of claim 32, wherein the porous container has an air permissivity of at least about 0.1 $cm^3$/min cm/psi.

36. The fuel cell of claim 32, wherein the porous container has a porosity of at least about 50%.

37. The fuel cell of claim 32, wherein the porous container has an average pore size of no more than about 300 micrometers.

38. The fuel cell of claim 32, wherein the cathode comprises a ceramic.

39. The device of claim 33, wherein the anode comprises tin.

40. The device of claim 33, wherein the anode consists essentially of tin.

41. The device of claim 33, wherein the porous container has an air permissivity of at least about 0.1 $cm^3$/min cm/psi.

42. The device of claim 33, wherein the porous container has a porosity of at least about 50%.

43. The device of claim 33, wherein the porous container has an average pore size of no more than about 300 micrometers.

44. The device of claim 33, wherein the porous container comprises a ceramic.

45. The device of claim 34, wherein the electrolyte comprises a ceramic.

46. The device of claim 34, wherein the cathode comprises a ceramic.

* * * * *